United States Patent Office 3,294,699
Patented Dec. 27, 1966

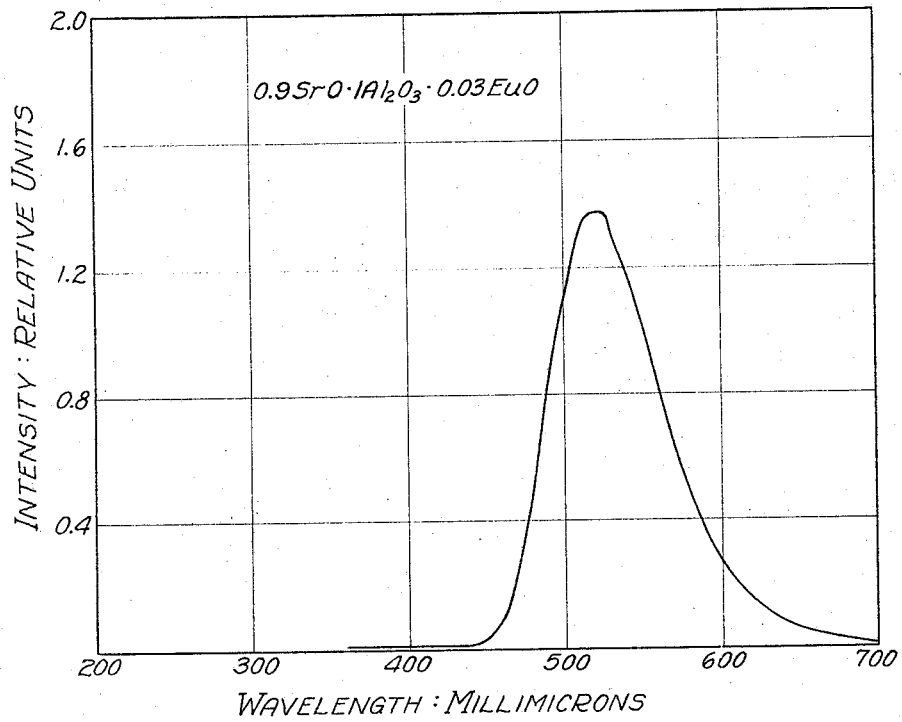

3,294,699
LUMINESCENT EUROPIUM ACTIVATED STRONTIUM ALUMINATE
Horst Lange, Berlin-Grunewald, Germany, assignor to Patent-Treuhand-Gesellschaft für elektrische Glüh-lampen m.b.H.
Filed Jan. 30, 1963, Ser. No. 254,969
Claims priority, application Germany, Feb. 8, 1962, P 28,763
6 Claims. (Cl. 252—301.4)

The present invention relates to an artificial luminescent material for use in electric discharge lamps, in screens of cathode ray tubes or in X-ray screens, as well as to an improved method of manufacturing this luminescent material.

As is generally known, luminescent materials usually consist of a base material in which a suitable activator is incorporated. There have already been described luminescent materials consisting of oxides or silicates of the alkaline earth metals as the base material and which contain an addition of europium as the activator. There have also been published reports on europium activated sulphides of alkaline earth metals and their luminescence under suitable excitation.

According to the invention, it has been found that good luminescent materials may be obtained if strontium aluminate is activated with europium (II) oxide (wherein Eu has a valence of 2). The amount of europium (II) oxide added to the strontium aluminate is between about 2 and 8 mol percent, particularly good results being obtained with a concentration of approximately 3 mol percent.

The single figure of the drawing is a spectral response curve typical of a strontium aluminate phosphor embodying the invention.

For the preparation of luminescent materials according to the invention, a mixture of strontium oxide, aluminum oxide and europium oxide is fired under reducing conditions. Alternatively, there may be used in the initial mixture, instead of strontium oxide and aluminum oxide, compounds which produce the oxides of strontium aluminate when heated. Also, instead of europium oxide there may be used an europium compound which produces europium oxide when heated. Very suitable compounds are for instance the carbonates, hydroxides and the like. The firing temperature for the mixture of initial materials should be in the range of 1400° C. to 1600° C., a firing temperature of about 1500° C. being optimum.

Strontium aluminate serving as the base material for the luminescent material may deviate in its composition from the stoichiometric proportion of strontium oxide to aluminum oxide given by the formula $SrAl_2O_4$. Such variations are customary in the chemistry of luminescent materials. Thus, it is well known that in compositions suitable as the base material for luminescent materials, the acid components must often be present in excess, for instance to the extent of 10 to 20 percent over stoichiometric proportions, in order to obtain highest brightness. In the case of strontium aluminate luminescent materials according to the present invention, it is advantageous to use an excess of aluminum oxide over stoichiometric proportions for the purpose of increasing intensity.

A luminescent material according to the invention may be excited for instance with ultraviolet rays. It is especially suitable for excitation by long wave ultraviolet rays such as are emitted by high-pressure mercury lamps. As shown in the curve of the accompanying drawing representing the spectral distribution of the emission from the luminescent material $0.9$ $SrO \cdot 1$ $Al_2O_3 \cdot 0.03$ $EuO$ when excited by the mercury line 365 m$\mu$ (millimicrons), the luminescent material emits a broad band spectrum with peak response in the green region at about 520 m$\mu$.

The quantum efficiency of a luminescent material according to the invention amounts to about 88 percent when compared with that of magnesium tungstate. With increasing temperature, the emission intensity decreases slowly above 100° C.

A specific example describing the preparation of a luminescent material in accordance with the invention will now be given. A charge consisting of:

| | G. |
|---|---|
| $SrCO_3$ | 13.28 |
| $Al(OH)_3$ | 15.60 |
| $Eu_2O_3$ | 0.53 | is intimately mixed and fired three times for one hour each time at 1500° C. in a forming gas current. After each firing the preparation is ground thoroughly. Suitably, the forming gas may consist of 4 parts nitrogen and 1 part hydrogen by volume.

The luminescent material obtained may be used in well known manner. It may, if desired, be used alone or mixed with other luminescent materials in electric discharge lamps or in screens for cathode ray tubes or in X-ray screens.

What I claim as new and desire to secure by Letters Patent of the United States is:

1. An artificial luminescent material consisting essentially of strontium aluminate activated with europium (II) oxide.

2. A luminescent material as defined in claim 1 characterized in that the concentration of europium (II) oxide in the strontium aluminate lies between 2 and 8 mol percent.

3. A luminescent material as defined in claim 1 characterized in that the concentration of europium (II) oxide in the strontium aluminate is approximately 3 mol percent.

4. The method of manufacturing an artificial luminescent material consisting essentially of strontium aluminate activated with europium (II) oxide comprising making a mixture of materials from the group consisting of strontium oxide, aluminum oxide, compounds yielding when heated strontium oxide and aluminum oxide, and compounds yielding when heated strontium aluminate, and a material from the group consisting of europium oxide and compounds yielding when heated europium oxide, and firing said mixture under reducing conditions at a temperature in the range of 1400° C. to 1600° C.

5. The method defined in claim 4 wherein the firing is carried out at about 1500° C.

6. The method defined in claim 4 wherein the firing is done in a current of a forming gas consisting of approximately 4 parts nitrogen and 1 part hydrogen by volume.

References Cited by the Examiner

UNITED STATES PATENTS 2,392,814   1/1946   Froelich _____ 252—301.4

OTHER REFERENCES

Kroger: "Some Aspects of the Luminescence of Solids," Elsevier Publ. Co., New York, 1948, pp. 60, 61, 270–272 and 292.

TOBIAS E. LEVOW, *Primary Examiner.*

MAURICE A. BRINDISI, *Examiner.*

R. D. EDMONDS, *Assistant Examiner.*